United States Patent [19]

Charles et al.

[11] 4,209,671
[45] Jun. 24, 1980

[54] METHOD AND APPARATUS FOR TESTING THE TIP-RING POLARITY OF TELEPHONE RECEPTACLES CONNECTED IN PARALLEL TO A NON-WORKING PAIR

[75] Inventors: Joseph T. Charles, Barrington Hills; James P. Ryan, Marengo, both of Ill.

[73] Assignee: Coil Sales & Manufacturing Company, Rolling Meadows, Ill.

[21] Appl. No.: 926,572

[22] Filed: Jul. 20, 1978

Related U.S. Application Data

[62] Division of Ser. No. 821,224, Aug. 2, 1977, Pat. No. 4,117,264.

[51] Int. Cl.² .............................................. H04M 1/24
[52] U.S. Cl. ............................... 179/175; 179/175.25; 324/133
[58] Field of Search ............ 179/175, 175.1, 175.1 A, 179/175.11, 175.2 R, 175.2 C, 175.21, 175.3, 175.25; 324/133

[56] References Cited

U.S. PATENT DOCUMENTS

| 2,956,229 | 10/1960 | Henel | 179/175 |
|---|---|---|---|
| 3,600,678 | 8/1971 | Garrett et al. | 179/175 |
| 3,711,661 | 1/1973 | Garrett et al. | 179/175.1 R |
| 3,766,335 | 10/1973 | Longstaff et al. | 179/175.3 R |
| 3,790,790 | 2/1974 | Norman | 324/133 |
| 3,806,803 | 4/1974 | Hall | 179/175 |
| 3,976,849 | 8/1976 | Champan | 179/175.25 |

OTHER PUBLICATIONS

Polarity tester for two-wire serial loop communications system, IBM Technical Disclosure Bulletin vol. 17, #5, Oct. 1974, Palouner & Skatrud.

*Primary Examiner*—Gerald Brigance
*Attorney, Agent, or Firm*—Leydig, Voit, Osann, Mayer & Holt, Ltd.

[57] ABSTRACT

A method and apparatus for testing the tip-ring polarity of telephone receptacles connected in parallel to a non-working pair includes a battery and an LED, the device being capable of being plugged into a subscriber's telephone receptacle. When a diode is properly placed across the non-working pair, the LED will light if the final terminals of the receptacle are wired with the correct tip-ring polarity. The disclosure teaches that the diode may be incorporated in various types of packages and may be connected across the non-working pair in several different ways.

12 Claims, 9 Drawing Figures

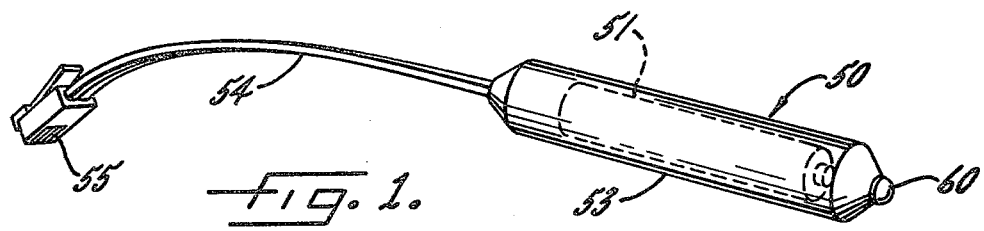
fig. 1.
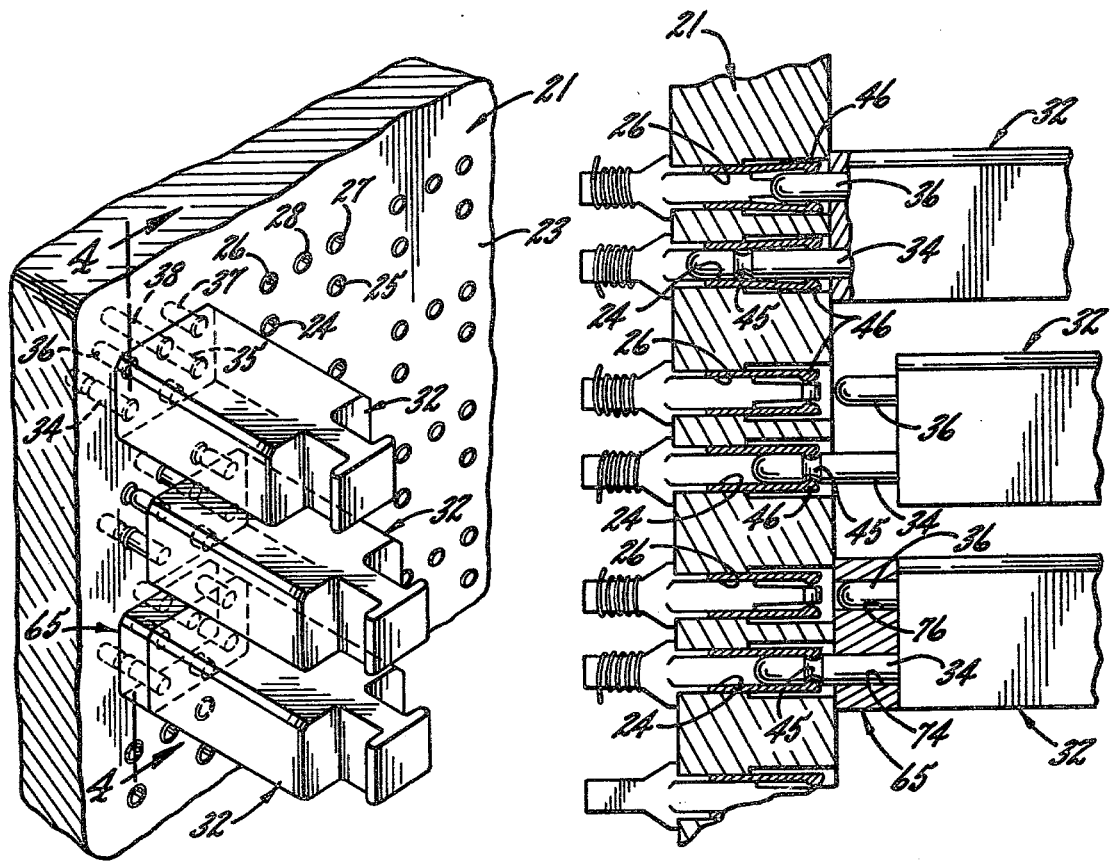
fig. 2.
fig. 4.
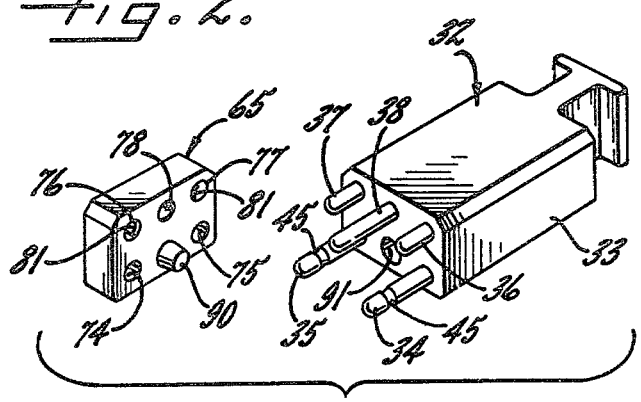
fig. 3.

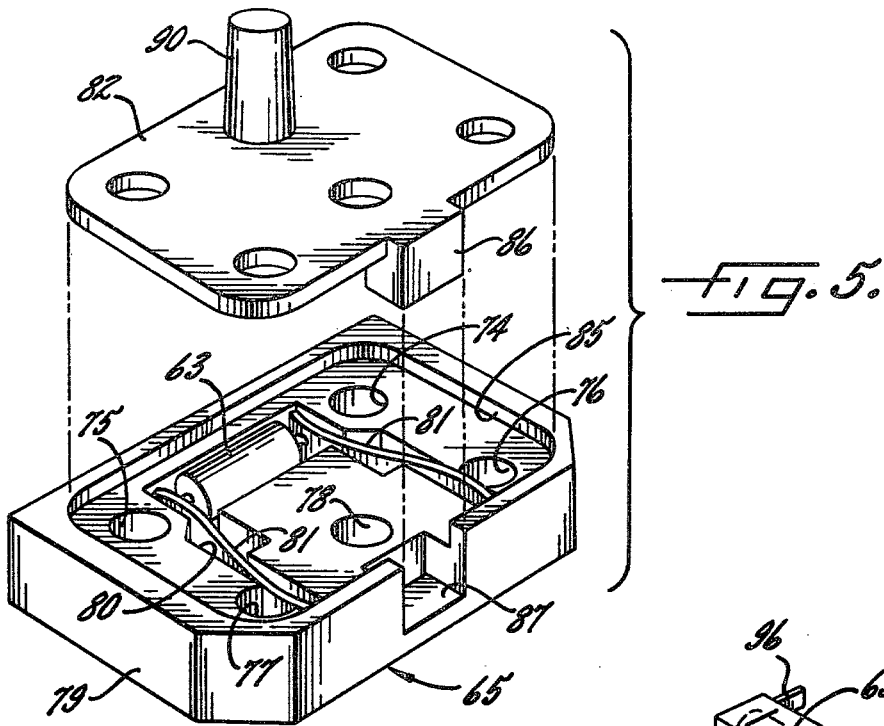
fig. 5.
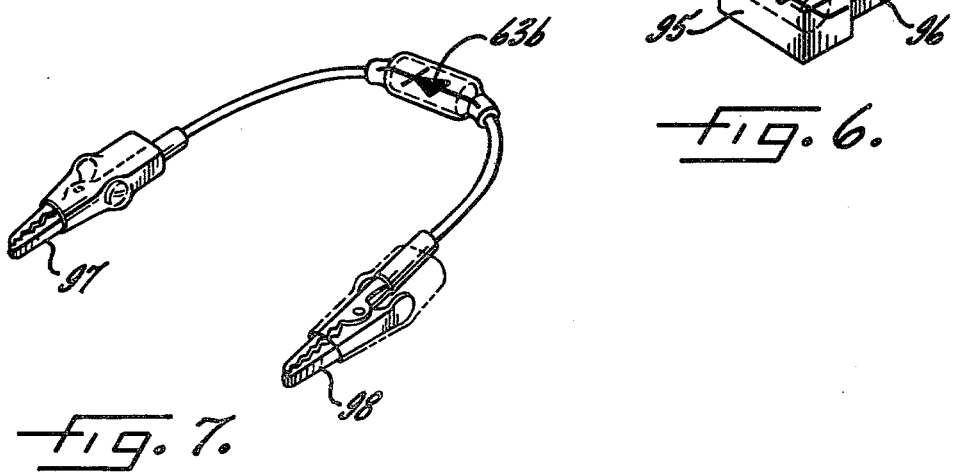
fig. 6.
fig. 7.
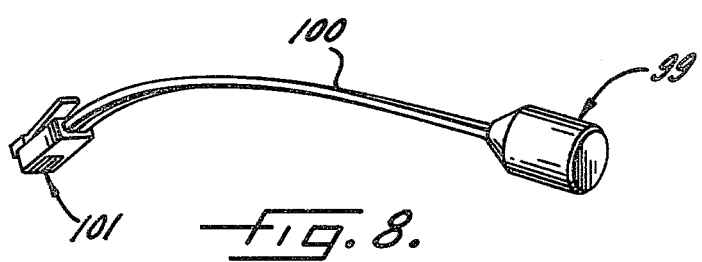
fig. 8.

METHOD AND APPARATUS FOR TESTING THE TIP-RING POLARITY OF TELEPHONE RECEPTACLES CONNECTED IN PARALLEL TO A NON-WORKING PAIR

This is a division of application Ser. No. 821,224, filed Aug. 2, 1977, now U.S. Pat. No. 4,117,264.

BACKGROUND OF THE INVENTION

This invention relates to the testing of the tip-ring polarity of a telephone receptacle.

Modern telephone equipment utilizes the so-called "Modular concept," meaning that each wall-mounted receptacle at a subscriber's location is a module capable of accepting the plug of a telephone which can be disconnected from the module and connected to a module in another room. With certain phones (e.g., "Touch Tone" phones), it is important that the final terminals of each receptacle be connected to the central office with the correct tip-ring (i.e., positive-negative) polarity. Both in new installations and in existing installations which are converted to the modular concept, it is possible that one or more receptacles could be miswired in that the final tip-ring terminals of the receptacle could be reversely wired with respect to tip-ring of the central office.

SUMMARY OF THE INVENTION

The general aim of the present invention is to provide new and improved method and apparatus for testing whether the tip-ring polarity of telephone receptacles is correct, the method and apparatus being characterized by its simplicity and being particularly adapted to enable easy testing of non-working receptacles (i.e., receptacles which are connected to a non-working pair of lines extending from the central office and which thus are not connected to the voltage source at the central office).

Another object of the invention is to provide a comparatively simple and easy to use testing device which carries its own battery to enable the testing of non-working receptacles and which carries an indicating light adapted to be energized by the battery if the receptacle is correctly wired.

A further object of the invention is to utilize unidirectional conducting means—preferably a diode—in conjunction with the testing device in order to insure that the indicating light will be energized only if the receptacle being tested is correctly wired.

Still another object is to provide a testing method in which the diode is connected across the non-working pair at the central office so that, when the test is performed, the indicating light will be energized only if there is correct tip-ring continuity throughout the entire circuit from the final terminals of the receptacle to the terminals at the central office.

An important object of the invention is to incorporate the diode in a unique package which enables the diode to be used in conjunction with a conventional lightning protector module at the central office and which enables the diode to be connected across the non-working pair at the central office when the protector is in an intermediate position disconnecting the pair from the central office voltage source but still providing lightning protection for the pair.

In a more detailed sense, the invention resides in providing a diode package in the form of a thin wafer which may be quickly and easily connected to and disconnected from a conventional lightning protector module.

These and other objects and advantages of the invention will become more apparent from the following detailed description when taken in conjunction with the accompanying drawings.

BRIEF DESCRIPTION OF THE DRAWINGS

FIG. 1 is a perspective view of a new and improved tip-ring polarity testing device incorporating the unique features of the present invention;

FIG. 2 is a fragmentary perspective view showing lightning protector modules plugged into a main frame connector at the central office;

FIG. 3 is a perspective view showing one of the lightning protector modules and further showing a diode package adapted to be used in conjunction with the module;

FIG. 4 is an enlarged fragmentary cross-section taken substantially along the line 4—4 of FIG. 2;

FIG. 5 is an enlarged exploded perspective view of the diode package shown in FIG. 3;

FIGS. 6, 7 and 8 are perspective views showing three different types of diode packages;

DETAILED DESCRIPTION OF THE PREFERRED EMBODIMENTS

Figure 9:
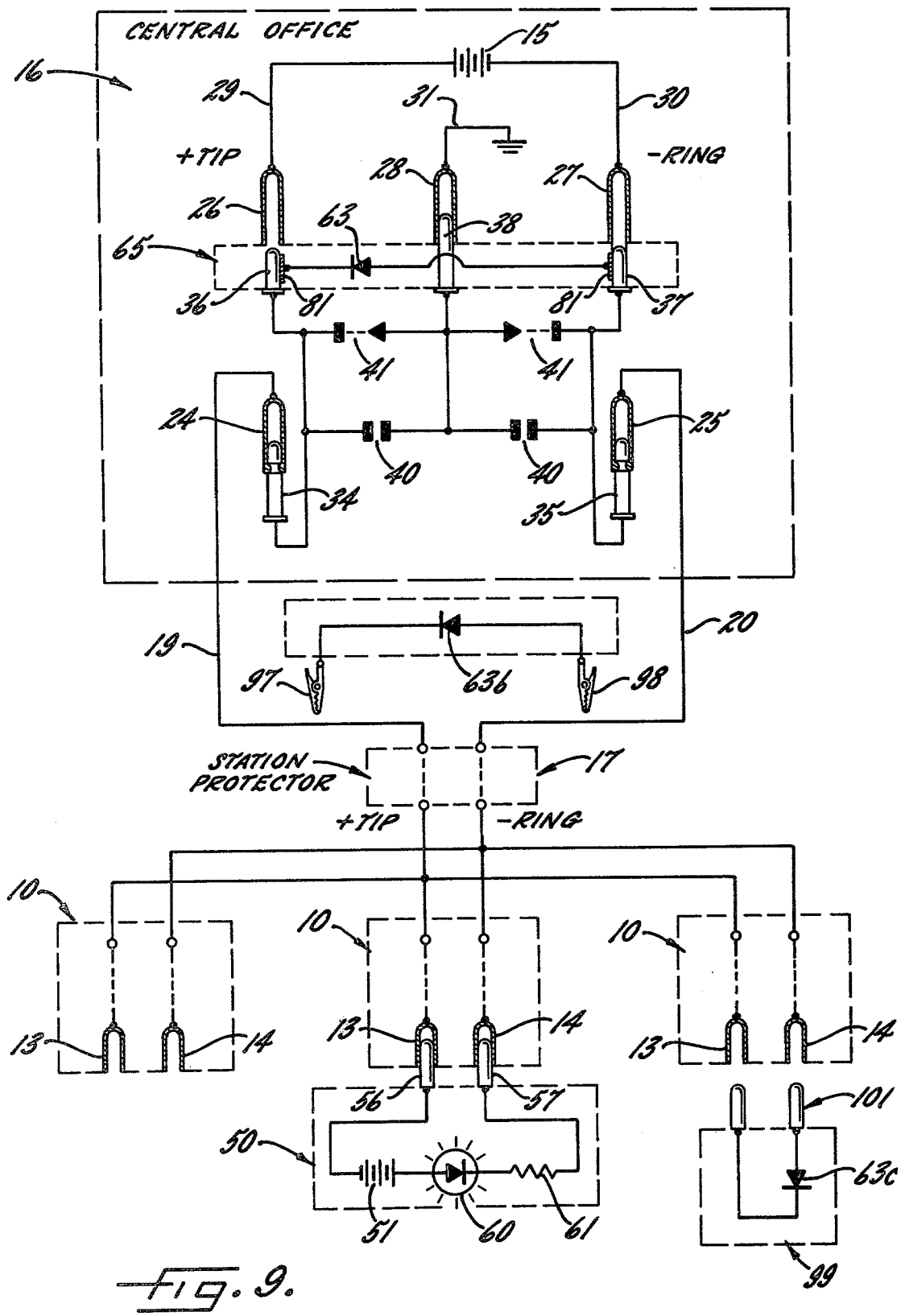
FIG. 9 is a circuit diagram showing a series of telephone receptacles connected to the central office by a non-working pair and schematically showing the testing device and certain ones of the diode packages of the present invention.

The invention is shown in the drawings in connection with a telephone system of the type in which the subscriber's station is equipped with one or more modular receptacles or jacks 10 (FIG. 9), each jack being capable of releasably accepting the plug of a portable telephone (not shown). Three jacks 10 are illustrated in FIG. 9 and each is shown as including a pair of final terminals in the form of sockets 13 and 14 which are adapted to receive prongs or pins on the plug of the phone. When the jacks are properly wired, the socket terminals 13 and 14 are connected to the positive and negative terminals, respectively, of a battery 15 or other voltage source at the central office 16. In accordance with conventional terminology, the positive terminal 13 is referred to as the tip terminal while the negative terminal 14 is referred to as the ring terminal. Additional socket terminals (not shown) usually are incorporated into each jack but such terminals have no relation to the present invention and thus need not be described.

As is customary, the jacks 10 are connected in parallel across a station protector 17 (FIG. 9) located at the subscriber's station and connected to the central office 16 by a pair of field tip-ring lines 19 and 20 leading from the station to the central office. In the present instance, the central office is shown as being equipped with a main frame connector 21 (FIG. 2) of the type identified as Model No. C-303 by Cook Electric Company of Morton Grove, Ill. Such a connector includes a panel 23 having a bank of five holes or sockets 24 to 28 for each pair of lines 19 and 20. The sockets 24 and 25 (shown as a pair of horizontally spaced lower sockets in the drawings) are connected electrically to the lines 19 and 20, respectively, and define the central office terminals for those lines (see FIG. 9). The sockets 26 and 27 are located above and are aligned vertically with the sockets 24 and 25, respectively, and are respectively connected to the positive and negative terminals of the battery 15 by central office tip and ring lines 29 and 30. A ground line 31 is connected to the remaining socket 28, the latter being centered between the sockets 26 and 27.

Associated with each bank of sockets 24 to 28 is a plug-in connector or protector module 32 (FIGS. 2 to 4) which serves to connect the field tip and ring lines 19 and 20 with the central office tip and ring lines 29 and 30 and which also serves as a lightning arrester for the field lines. The particular module which has been illustrated is identified as a Type 3A by Cook Electric Company and comprises a plastic housing 33 having five pins 34 to 38 adapted to plug into the sockets 24 to 28 (see FIG. 9). The pins 34 and 35 are connected electrically to the pins 36 and 37, respectively, and thus serve to connect the field lines 19 and 20 with the central office lines 29 and 30 when the pins are plugged into their respective sockets. Carbon arresters 40 are connected across each of the pins 34 and 35 and the ground pin 38 while metallic shunts 41 with fusable pellets are placed across the ground pin 38 and each of the pins 36 and 37 in order to ground the pins if a power fault occurs and causes the pellets to melt.

As shown in FIGS. 3, 4 and 9, the upper pins 36 and 37 of the protector module 32 are only approximately half as long as the lower pins 34 and 35 and the ground pin 38. As a result, the module 32 may be plugged into the connector 21 in an intermediate or so-called "detent" position (see the central module in FIG. 4) in which the longer pins 34, 35 and 38 make electrical contact with the sockets 24, 25 and 28 while the shorter pins 36 and 37 remain out of electrical contact with the sockets 26 and 27. When the module is in its detent position, the connected pins 34, 35 and 38 coact with the carbon arresters 40 to provide lightning protection for the field lines 19 and 20 but the pins 36 and 37 leave the battery 15 disconnected from the field lines so that the latter constitute a non-working pair. When the module 32 is pushed into its fully plugged-in position as shown by the top module in FIG. 4, the pins 36 and 37 make electrical contact with the sockets 26 and 27 and connect the battery across the field lines to convert the lines to a working pair and to cause the battery voltage to be applied to the jacks 10.

To hold the protector module 32 in its detent position, circumferentially extending grooves 45 (FIGS. 3 and 4) are formed around the pins 34 and 35 intermediate the ends thereof and are adapted to interlock releasably with detents 46 (FIG. 4) in the sockets 24 and 25. Frequently, the module 32 will be placed and kept in its detent position while the jacks 10, the station protector 17 and other equipment at the subscriber's station are being installed and wired so that the field lines 19 and 20 and the station equipment will be protected against lightning during the installation period but will not be operable. The module then may be pushed into its fully plugged-in position when it is desired to place the subscriber's station into service.

Certain types of telephones such as "Touch Tone" phones will operate correctly only if the tip-ring terminals 13 and 14 of the jacks 10 are connected to the tip-ring lines 29 and 30, respectively, at the central office 16. Because of human error, however, it is possible that the tip-ring terminals 13 and 14 of a given jack 10 could be reversely wired with respect to the tip-ring lines 29 and 30 at the central office. Such reverse wiring could occur at the jacks themselves, at the station protector 17 or other terminals in the field wiring or at the subscriber's station, or even at the central office itself.

In accordance with one of its aspects, the present invention contemplates the provision of a unique testing device 50 (FIGS. 1 and 9) having a self-contained battery 51 and capable of enabling the phone installer to easily check whether each of the jacks 10 is wired with the correct tip-ring polarity. Because the battery 51 is incorporated in the testing device 50, the installer may use the testing device to check the tip-ring polarity of a non-working jack 10 without need of placing a battery across the field lines 19 and 20 other than at the jack itself.

More specifically, the testing device 50 comprises a cylindrical case 53 (FIG. 1) molded of plastic and of sufficient size to enclose the battery 51, the latter herein being a 4.5 volt Eveready No. 333. Extending from one end of the case is a flexible cord 54 whose free end carries a connector or plug 55 having tip and ring terminals 56 and 57 (FIG. 9) which will connect only with the tip and ring sockets 13 and 14 of each jack 10. The tip terminal 56 of the plug 55 is connected to the negative terminal of the battery 51 while the ring terminal 57 of the plug is connected to the cathode terminal of a light-emitting diode 60 (LED) whose anode terminal is connected to the positive terminal of the battery. The LED 60 is physically located on and is visible from the end of the case 53 opposite the cord 54 as shown in FIG. 1 and is protected by a current-limiting resistor 61 (FIG. 9) connected between the ring terminal 57 of the plug and the cathode of the LED.

When the plug 55 of the testing device 50 is inserted into one of the jacks 10 with the tip and ring terminals 56 and 57 contacting the tip and ring socket terminals 13 and 14, respectively, of the jack as shown in FIG. 9, the LED 60 will be energized and will light if the tip and ring terminals of the jack are properly wired such that the tip socket 13 is truly positive and the ring socket 14 is truly negative. To enable the LED to light but to light only if the sockets 13 and 14 are correctly wired, it is necessary to place a unidirectional conducting device such as a diode 63 across the sockets 13 and 14 and the series combination of the battery 51 and the LED.

In carrying out the invention, the diode 63 preferably is connected across the sockets 13 and 14 at the central office 16 itself so that, when the installer checks the tip-ring polarity of the sockets, the presence of a signal from the LED 60 will indicate that the wiring is poled correctly throughout the entire circuit from the sockets to the central office and further will indicate that such circuit is continuous. While the diode may be associated with the central office equipment in various ways depending upon the nature of the equipment, the present invention contemplates incorporating the diode in a package in the form of a simple and relatively inexpensive wafer 65 (FIGS. 3 to 5 and 9) which may be installed on the protector module 32 and which, when installed, serves to protect the module against being inadvertently pushed in from its detent position to its fully plugged-in position.

As shown in FIGS. 3 and 5, the wafer 65 includes five spaced holes 74 to 78 which are located so as to align with the pins 34 to 38, respectively, of the module 32. The wafer is molded from a suitable plastic and includes a housing 79 (FIG. 5) formed with a central cavity 80 which communicates at least with the holes 76 and 77. Located within the cavity are two conductors in the form of spring metal strips 81 whose upper end portions intersect and project into the holes 76 and 77 so as to make electrical contact with the pins 36 and 37 when the wafer is slipped onto the module 32. The lower end portions of the strips 81 are shaped in such a manner as to be biased into contact with the terminals of the diode 63, the latter being located within the cavity 80 between the strips.

The housing 79 is closed by a plastic cap 82 (FIG. 5) adapted to fit in a counter-recess 85 at the upper end of the cavity 80 and adapted to be bonded to the housing by cement or sonic welding. To insure that the cap 82 will be properly positioned relative to the housing 79, the cap is formed with a tab 86 which is sized to fit within a notch 87 in the housing.

By virtue of the foregoing arrangement, the wafer 65 may be fitted onto the module 32 with the five holes 74 to 78 in the wafer fitting onto the five pins 34 to 38 of the module, with the thickness of the wafer occupying the length of the pins 36 and 37, and with the upper end portions of the strips 81 making electrical contact with those pins. Accordingly, the wafer 65 occupies that space which exists between the connector panel 23 and the module 32 when the latter is in its detent position and serves to prevent the module from being inadvertently pushed in from its detent position to its fully plugged-in position (see the lower module in FIG. 4).

With the wafer 65 thus installed on the module 32, the spring metal strips 81 contact the pins 36 and 37 and serve to connect the diode 63 across those pins, the pins 34 and 35, the sockets 24 and 25, the field lines 19 and 20 and the socket terminals 13 and 14 of each jack 10. The diode is poled with its cathode connected to the pin 36 and with its anode connected to the pin 37 so that the diode will conduct only from ring to tip. To insure that the diode will be so poled when the wafer is installed on the module, the cover 85 of the wafer is formed with a projection 90 (FIGS. 3 and 5) of circular cross-section and sized to telescope into a hole 91 (FIG. 3) formed in the module and located between the pins 34 and 35. If the wafer 65 should be installed reversely on the module 32 in such a manner as to cause the diode 63 to be reversely poled across the pins 36 and 37, the projection 90 will extend outwardly and will abut the panel 23 of the connector 21 thus providing a positive interference element to prevent the module from being plugged in even to its detent position.

When the wafer 65 is correctly installed on the module 32 and the latter is in its detent position as shown in FIG. 9 and by the lower module in FIG. 4, the cathode of the diode 63 is connected to the field tip line 19 by way of the pin 36, the pin 34 and the socket 24. Also, the anode of the diode is connected to the field ring line 20 via the pin 37, the pin 35 and the socket 25. The diode thus will conduct current from the ring line 20 to the tip line 19 but will prevent current from flowing reversely between the lines. Accordingly, the LED 60 will be energized and will light when the testing device 50 is plugged into one of the jacks 10 and the tip-ring socket terminals 13 and 14 of that jack are correctly connected to tip-ring at the central office 16. Under such circumstances, current from the positive terminal of the battery 51 flows through the LED 60 to the ring socket terminal 14, thence through the station protector 17 and the field line 20 to the socket 25, the pin 35 and the pin 37, thence through the diode 63 to the pin 36, the pin 34 and the socket 24, and then through the field line 19 and back through the station protector 17 to the tip socket terminal 13 and the negative terminal of the battery 51. But, if either the jack 10, the station protector 17 or the central office 16 is miswired in such a manner that the tip-ring socket terminals 13 and 14 are connected to the ring-tip, respectively, at the central office, the diode 63 will not allow current from the positive terminal of the battery 51 to flow from the line 19 to the line 20 and thus the LED 60 will not be energized. When the LED does not light, the installer is advised that either a miswiring has occurred at some point between the socket terminals 13 and 14 and the central office 16 or that the circuit between the terminals and the central office is not continuous.

As mentioned previously, the wafer 65 prevents the protector module 32 from inadvertently being pushed into its fully plugged-in position as is shown clearly by the lower module in FIG. 4. After all of the jacks 10 at the station have been tested and when it is desired to place the station in service, the wafer may be removed from the module to permit the latter to be fully plugged in so as to connect the central office battery 15 across the field lines 19 and 20.

When the central office 16 is not equipped with a protector module 32 of the type shown, the diode 63 may be incorporated in a package other than the wafer 65 and designed to be compatible with the particular central office equipment. For example, a diode 63a (FIG. 6) similar to the diode 63 may be packaged in a plastic box 95 and connected to spring metal prongs 96 projecting from one end of the box. The prongs are spaced from one another so as to fit between the spring contacts of certain central office lightning protectors and, when connected to the protector, serve to place the diode across the tip and ring lines 19 and 20 at the central office.

In lieu of the diodes 63 and 63a, a diode 63b (FIGS. 7 and 9) may be wired between two alligator clips 97 and 98 adapted to be connected to the tip-ring lines of the system at any accessible point between the jacks 10 and the central office 16. For example, the installer may attach the clips 97, 98 to the tip-ring terminals of the station protector 17 prior to checking the polarity of the jacks with the testing device 50. With the clips so attached and with the diode 63b properly poled, energization of the LED 60 will indicate that a given jack is properly wired with respect to the station protector 17 but will not serve to indicate whether there is correct wiring between the station protector and the central office 16. To assist in connecting the clips 97, 98 with the diode 63b properly poled, the wire lead to the clip 97 for the tip line may be colored green and the wire lead to the clip 98 for the ring line may be colored red, it being understood that this color coding for tip-ring connections is conventional.

A diode 63c (FIG. 9) also may be packaged in a plastic case 99 having a cord 100 (FIG. 8) and a plug 101 similar to the cord 54 and plug 55 of the testing device 50. When the plug 101 is inserted into one of the jacks 10, the diode 63c is connected across the tip-ring terminals 13 and 14 of the other jacks and thus the polarity of such jacks may be checked with the testing device 50.

From the foregoing, it will be apparent that the present invention brings to the art new and improved method and apparatus for testing the tip-ring polarity of telephone jacks 10. While the method and apparatus have been illustrated and described in some detail in conjunction with particular embodiments, it will be appreciated that the invention is not limited to such detail but instead is intended to embrace all alternative embodiments within the spirit and scope of the appended claims.

We claim as our invention:

1. A method of checking whether each of a plurality of a subscriber's phone receptacles has correct tip-ring polarity at the final terminals of the receptacle, said receptacle being connected in parallel with one another across a non-working pair, said method comprising the steps of, connecting unidirectional conducting means across the tip and ring of the pair at a point other than at the receptacles to be tested with the means being poled to conduct from the ring to the tip, sequentially connecting the series combination of a battery and a light-emitting diode to the final terminals of each receptacle to be tested with the cathode of the light-emitting diode being connected to the ring terminal and with the negative terminal of the battery being connected to the tip terminal, and determining whether the light-emitting diode lights when said series combination is so connected to the final terminals of each receptacle being tested.

2. A method as defined in claim 1 in which said unidirectional conducting means is a diode connected across said pair at the central office.

3. A method as defined in claim 1 in which said unidirectional conducting means is a diode connected across said pair at the subscriber's station protector.

4. A method as defined in claim 1 in which said diode is connected across said pair at the final terminals of one of said receptacles.

5. Apparatus for checking whether the tip and ring terminals of a telephone receptacle connected in parallel to a non-working pair have correct tip-ring polarity, said device comprising a case, a battery contained within said case, a light-emitting diode supported by said case and having its anode connected to the positive terminal of said battery, a connector having first and second terminals adapted to contact the tip and ring terminals, respectively, of said receptacle with the first terminal of said connector being connected to the negative terminal of said battery and the second terminal of said connected being connected to the cathode of said diode, and including unidirectional conducting means connected across the tip and ring of the non-working pair at a point other than at the receptacle being tested with the means being poled to conduct from the ring to the tip of the pair.

6. Apparatus as defined in claim 5 which said unidirectional conducting means is a diode connected across said pair at the central office.

7. Apparatus as defined in claim 6 in which said diode is contained in a wafer package with aperatures adapted to receive the pins of a central station protector module.

8. Apparatus as defined in claim 6 in which said diode is contained in a plug-in type module with prongs for making contact with the tip and ring lines at the central office.

9. Apparatus as defined in claim 5 in which said unidirectional conducting means is a diode connected across said pair at the subscriber's station protector.

10. Apparatus as defined in claim 9 in which said diode is connected in series between a pair of color coded alligator clip connectors.

11. Apparatus as defined in claim 5 in which said unidirectional conducting means is a diode connected across said pair at the final terminals of one of the subscriber's telephone outlet receptacles.

12. Apparatus as defined in claim 11 in which said diode is contained in a package connected to a cord having a jack for insertion in a telephone outlet receptacle.

* * * * *

UNITED STATES PATENT OFFICE
CERTIFICATE OF CORRECTION

Patent No. 4,209,671     Dated June 24, 1980

Inventor(s) Joseph T. Charles and James P. Ryan

It is certified that error appears in the above-identified patent and that said Letters Patent are hereby corrected as shown below:

IN THE CLAIMS:

Claim 1, line 4, change "receptacle" to --receptacles--.

Claim 4, lines 1 and 2, delete "diode is" and insert --unidirectional conducting means is a diode--.

Claim 5, line 12, change "connected" (first occurrence) to --connector--.

Claim 6, line 1, after "5" insert --in--.

Claim 7, line 2, change "aperatures" to --apertures--.

Signed and Sealed this

Twenty-third Day of September 1980

[SEAL]

Attest:

SIDNEY A. DIAMOND

Attesting Officer     Commissioner of Patents and Trademarks